(12) United States Patent
Capps

(10) Patent No.: US 6,374,524 B1
(45) Date of Patent: Apr. 23, 2002

(54) PORTABLE TRAFFIC SIGNALING AND EMERGENCY RESPONSE DEVICE

(76) Inventor: Donald Capps, 11259 Sonora Trail, Redding, CA (US) 96003

( * ) Notice: Subject to any disclaimer, the term of this patent is extended or adjusted under 35 U.S.C. 154(b) by 0 days.

(21) Appl. No.: 09/755,996

(22) Filed: Jan. 8, 2001

(51) Int. Cl.$^7$ ................................................ H01M 2/10
(52) U.S. Cl. ........................................ 40/612; 320/115
(58) Field of Search .................. 40/612, 606, 610; 320/105, 107, 115

(56) References Cited

U.S. PATENT DOCUMENTS

| 4,543,905 A | 10/1985 | McKenney | 116/63 P |
|---|---|---|---|
| 4,632,598 A | 12/1986 | Richards | 404/6 |
| 5,077,513 A | * 12/1991 | Dea et al. | 320/105 |
| 5,294,138 A | 3/1994 | Yang | 280/47.34 |
| 5,422,638 A | * 6/1995 | Singer et al. | 340/908.1 |

* cited by examiner

Primary Examiner—Cassandra H. Davis
(74) Attorney, Agent, or Firm—Goldstein Law Offices, PC

(57) ABSTRACT

A portable traffic signaling and emergency response device including a hand cart. A battery is secured to the hand cart. A CB radio is secured to the hand cart. The CB radio is operatively coupled with the battery. A warning sign is provided having a first side with "stop" printed thereon. The warning sign has a second side with "slow" printed thereon. A pair of warning flags are provided with each having a handle extending downwardly therefrom.

6 Claims, 2 Drawing Sheets

PORTABLE TRAFFIC SIGNALING AND EMERGENCY RESPONSE DEVICE

BACKGROUND OF THE INVENTION

The present invention relates to a portable traffic signaling and emergency response device and more particularly pertains to providing road side assistance to disabled vehicles and alerting other vehicles of a traffic situation.

Traffic signals are generally permanently mounted at traffic intersections to control the flow of traffic at an intersection or the like. These traffic signals sometimes become damaged thereby being rendered inoperative. Thus, some device is needed for traffic control before the traffic signals are restored. To the same end, construction on a road or highway may require some form of temporary traffic control. These temporary measures may include individuals standing in the traffic lanes to control the flow of traffic. What is always seen while traveling is a vehicle that is stopped on the side of the road because of some type of operative problems. The present invention seeks attempts to provide a device which will serve as a traffic indicator and also provide for the assistance in correcting the operative problems of the vehicle.

The use of traffic indicators is known in the prior art. More specifically, traffic indicators heretofore devised and utilized for the purpose of indicating traffic situations are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,543,905 to McKenney discloses a portable traffic signaling device mounted on a wheeled trailer. U.S. Pat. No. 5,294,138 to Yang discloses a signaling device, comprised of a traffic signal attached to a rolling wheel assembly. U.S. Pat. No. 4,632,598 to Richards discloses a movable roadway barrier with retractable wheels incorporated.

While these devices fulfill their respective, particular objective and requirements, the aforementioned patents do not describe a portable traffic signaling and emergency response device for providing road side assistance to disabled vehicles and alerting other vehicles of a traffic situation.

In this respect, the portable traffic signaling and emergency response device according to the present invention substantially departs from the conventional concepts and designs of the prior art, and in doing so provides an apparatus primarily developed for the purpose of providing road side assistance to disabled vehicles and alerting other vehicles of a traffic situation.

Therefore, it can be appreciated that there exists a continuing need for new and improved portable traffic signaling and emergency response device which can be used for providing road side assistance to disabled vehicles and alerting other vehicles of a traffic situation. In this regard, the present invention substantially fulfills this need.

SUMMARY OF THE INVENTION

In the view of the foregoing disadvantages inherent in the known types of traffic indicators now present in the prior art, the present invention provides an improved portable traffic signaling and emergency response device. As such, the general purpose of the present invention, which will be described subsequently in greater detail, is to provide a new and improved portable traffic signaling and emergency response device and method which has all the advantages of the prior art and none of the disadvantages.

To attain this, the present invention essentially comprises a hand cart comprised of an inverted U-shaped frame member with a handle formed at an upper end of the frame member. The frame member has an upper and a lower cross member extending between opposed vertical extents thereof. The frame member has a pair of wheels disposed on lower ends thereof. The lower ends have a platform extending outwardly therefrom. An outer end of the platform has a securement strap extending outwardly therefrom. The frame member has a pair of vertically aligned collars secured to one of the vertical extents thereof. The vertical extents each have an angularly disposed collar secured to upper ends thereof. A battery is positioned on the platform of the hand cart. The battery is secured to the platform with the securement strap. A CB radio is secured to the upper cross member of the hand cart. The CB radio is operatively coupled with the battery. The CB radio has an antenna secured to the upper cross member. A warning sign is provided having a handle extending downwardly therefrom. The handle is positioned through the pair of vertically aligned collars of the hand cart. The warning sign has a first side with "stop" printed thereon. The warning sign has a second side with "slow" printed thereon. A pair of warning flags are provided with each having a handle extending downwardly therefrom. The handles of the warning flags are received within the angularly disposed collars of the hand cart.

There has thus been outlined, rather broadly, the more important features of the invention in order that the detailed description thereof that follows may be better understood, and in =order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable traffic signaling and emergency response device which has all the advantages of the prior art traffic indicators and none of the disadvantages.

It is another object of the present invention to provide a new and improved portable traffic signaling and emergency response device which may be easily and efficiently manufactured and marketed.

It is a further object of the present invention to provide a new and improved portable traffic signaling and emergency response device which is of durable and reliable construction.

An even further object of the present invention is to provide a new and improved portable traffic signaling and emergency response device which is susceptible of a low cost of manufacture with regard to both materials and labor, and which accordingly is then susceptible of low prices of sale to the consuming public, thereby making such a portable traffic signaling and emergency response device economically available to the buying public.

Even still another object of the present invention is to provide a new and improved portable traffic signaling and emergency response device for providing road side assistance to disabled vehicles and alerting other vehicles of a traffic situation.

Lastly, it is an object of the present invention to provide a new and improved portable traffic signaling and emergency response device including a hand cart. A battery is secured to the hand cart. A CB radio is secured to the hand cart. The CB radio is operatively coupled with the battery. A warning sign is provided having a first side with "stop" printed thereon. The warning sign has a second side with "slow" printed thereon. A pair of warning flags are provided with each having a handle extending downwardly therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
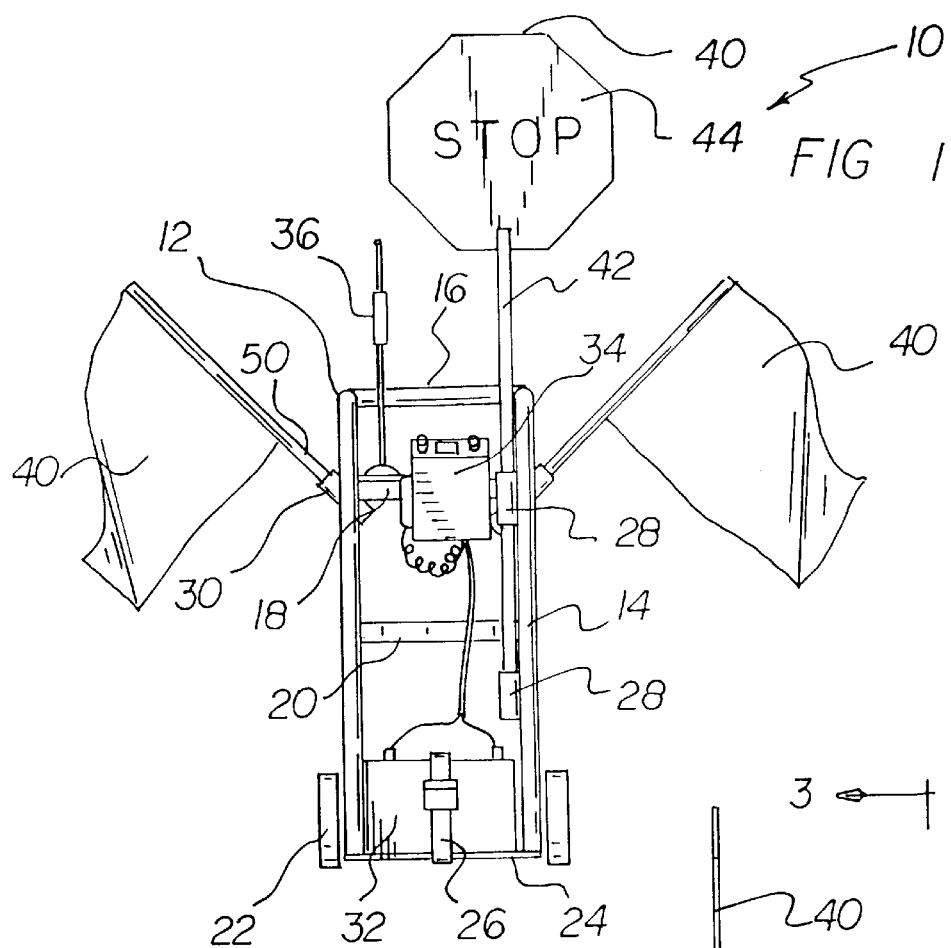
FIG. 1 is a front view of the preferred embodiment of the portable traffic signaling and emergency response device constructed in accordance with the principles of the present invention.
Figure 2:
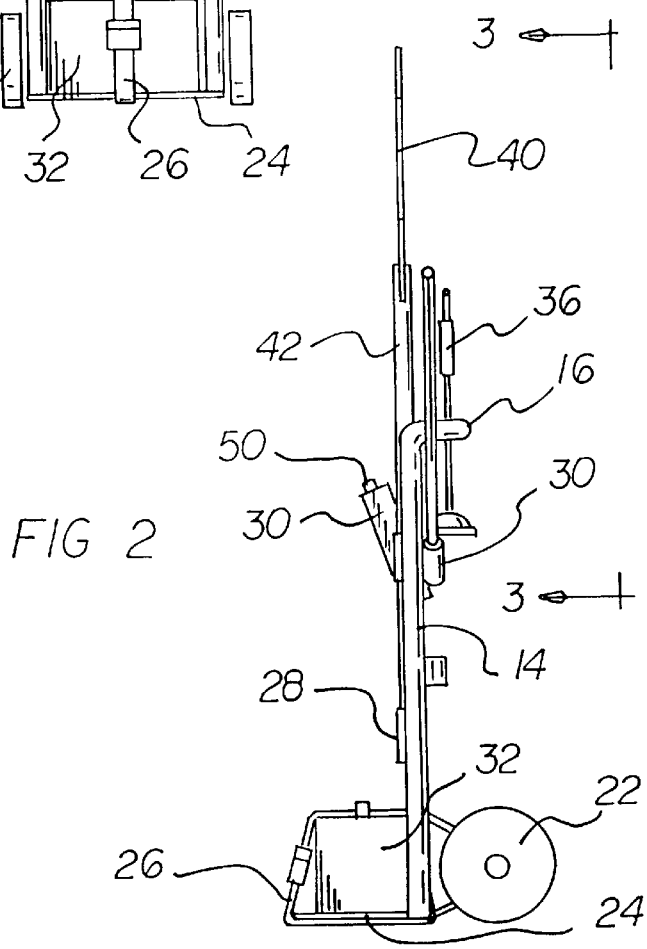
FIG. 2 is a side elevation view of the present invention.
Figure 3:
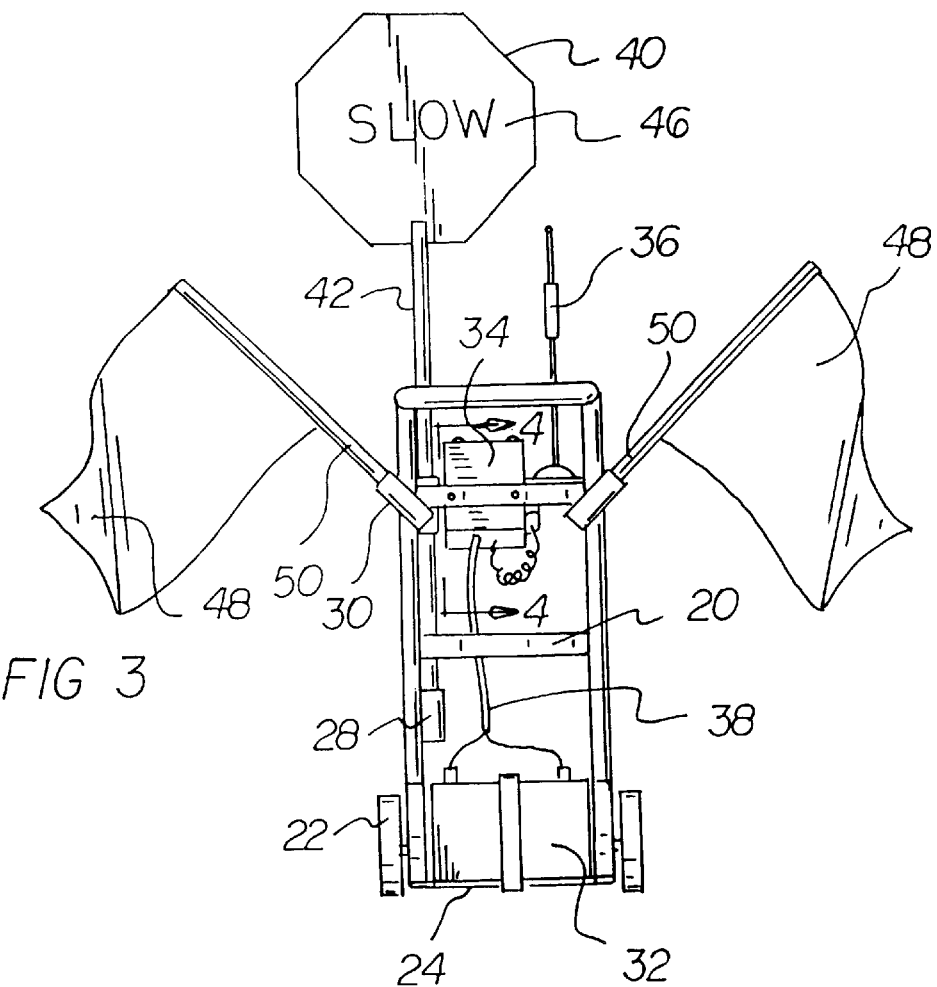
FIG. 3 is a rear view of the present invention as taken along line 3—3; of FIG. 2.
Figure 4:
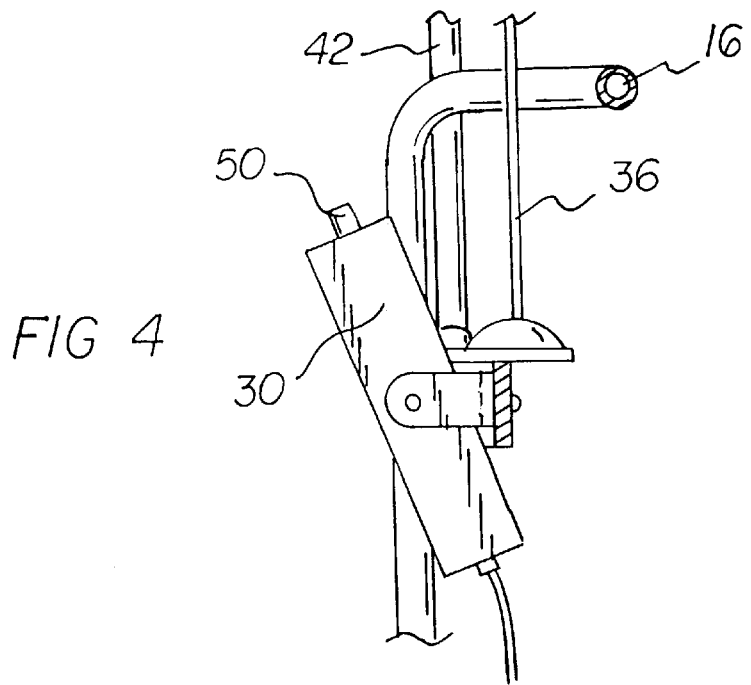
FIG. 4 is a cross-sectional view of the present invention as taken along line 4—4 of FIG. 3.

With reference now to the drawings, and in particular, to FIGS. 1 through 4 thereof, the preferred embodiment of the new and improved portable traffic signaling and emergency response device embodying the principles and concepts of the present invention and generally designated by the reference number 10 will be described.

Specifically, it will be noted in the various Figures that the device relates to a portable traffic signaling and emergency response device for providing road side assistance to disabled vehicles and alerting other vehicles of a traffic situation. In its broadest context, the device consists of a hand cart, a battery, a CB radio, a warning sign, and a pair of warning flags. Such components are individually configured and correlated with respect to each other so as to attain the desired objective The hand cart 12 is comprised of an inverted U-shaped frame member 14 with a handle 16 formed at an upper end of the frame member 14. The frame member 14 has an upper and a lower cross member 18,20 extending between opposed vertical extents thereof. The frame member 14 has a pair of wheels 22 disposed on lower ends thereof. The lower ends have a platform 24 extending outwardly therefrom. An outer end of the platform 24 has a securement strap 26 extending outwardly therefrom. The frame member 14 has a pair of vertically aligned collars 28 secured to one of the vertical extents thereof. The vertical extents each have an angularly disposed collar 30 secured to upper ends thereof.

The battery 32 is positioned on the platform 24 of the hand cart 12. The battery 32 is secured to the platform 24 with the securement strap 26. The battery 32 can be used to jump start a stalled vehicle that cannot be started because of a failed battery.

The CB radio 34 is secured to the upper cross member 18 of the hand cart 12. The CB radio 34 is operatively coupled with the battery 32. The CB radio 34 has an antenna 36 secured to the upper cross member 18. The CB radio 34 is powered by the battery 32 via the use of a pair of connector cables 38. The CB radio 34 can be used to call for additional help after assessing the situation involved with a troubled vehicle or the like.

The warning sign 40 has a handle 42 extending downwardly therefrom. The handle 42 is positioned through the pair of vertically aligned collars 28 of the hand cart 12. The warning sign 40 has a first side 44 with "stop" printed thereon. The warning sign 40 has a second side 46 with "slow" printed thereon.

The pair of warning flags 48 each have a handle 50 extending downwardly therefrom. The handles 50 of the warning flags 48 are received within the angularly disposed collars 30 of the hand cart 12. The warning flags 48 can each be a different color to correspond with known warning signal colors used in traffic situations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A portable traffic signaling and emergency response device for providing road side assistance to disabled vehicles and alerting other vehicles of a traffic situation comprising, in combination:

a hand cart comprised of an inverted U-shaped frame member with a handle formed at an upper end of the frame member, the frame member having an upper and a lower cross member extending between opposed vertical extents thereof, the frame member having a pair of wheels disposed on lower ends thereof, the lower ends having a platform extending outwardly therefrom, an outer end of the platform having a securement strap extending outwardly therefrom, the frame member having a pair of vertically aligned collars secured to one of the vertical extents thereof, the vertical extents each having an angularly disposed collar secured to upper ends thereof;

a battery positioned on the platform of the hand cart, the battery being secured to the platform with the securement strap;

a CB radio secured to the upper cross member of the hand cart, the CB radio being operatively coupled with the battery, the CB radio having an antenna secured to the upper cross member;

a warning sign having a handle extending downwardly therefrom, the handle being positioned through the pair of vertically aligned collars of the hand cart, the warning sign having a first side with "stop" printed thereon, the warning sign having a second side with "slow" printed thereon;

a pair of warning flags each having a handle extending downwardly therefrom, the handles of the warning flags being received within the angularly disposed collars of the hand cart.

2. A portable traffic signaling and emergency response device for providing road side assistance to disabled vehicles and alerting other vehicles of a traffic situation comprising, in combination:

a hand cart;

a battery coupled with the hand cart;

a CB radio secured to the hand cart, the CB radio being operatively coupled with the battery;

a warning sign having a handle extending downwardly therefrom, the warning sign having a first side with "stop" printed thereon, the warning sign having a second side with "slow" printed thereon;

a pair of warning flags each having a handle extending downwardly therefrom.

3. The portable traffic signaling and emergency response device as set forth in claim 2 wherein the hand cart is comprised of an inverted U-shaped frame member with a handle formed at an upper end of the frame member, the frame member having an upper and a lower cross member extending between opposed vertical extents thereof, the frame member having a pair of wheels disposed on lower ends thereof, the lower ends having a platform extending outwardly therefrom for receiving the battery thereon.

4. The portable traffic signaling and emergency response device as set forth in claim 3 wherein an outer end of the platform has a securement strap extending outwardly therefrom for engaging the battery to the platform.

5. The portable traffic signaling and emergency response device as set forth in claim 4 wherein the frame member has a pair of vertically aligned collars secured to one of the vertical extents thereof for receiving the handle of the warning sign therein.

6. The portable traffic signaling and emergency response device as set forth in claim 5 wherein the vertical extents each have an angularly disposed collar secured to upper ends thereof for receiving the handles of the warning flags therein.

* * * * *